Figure 1:
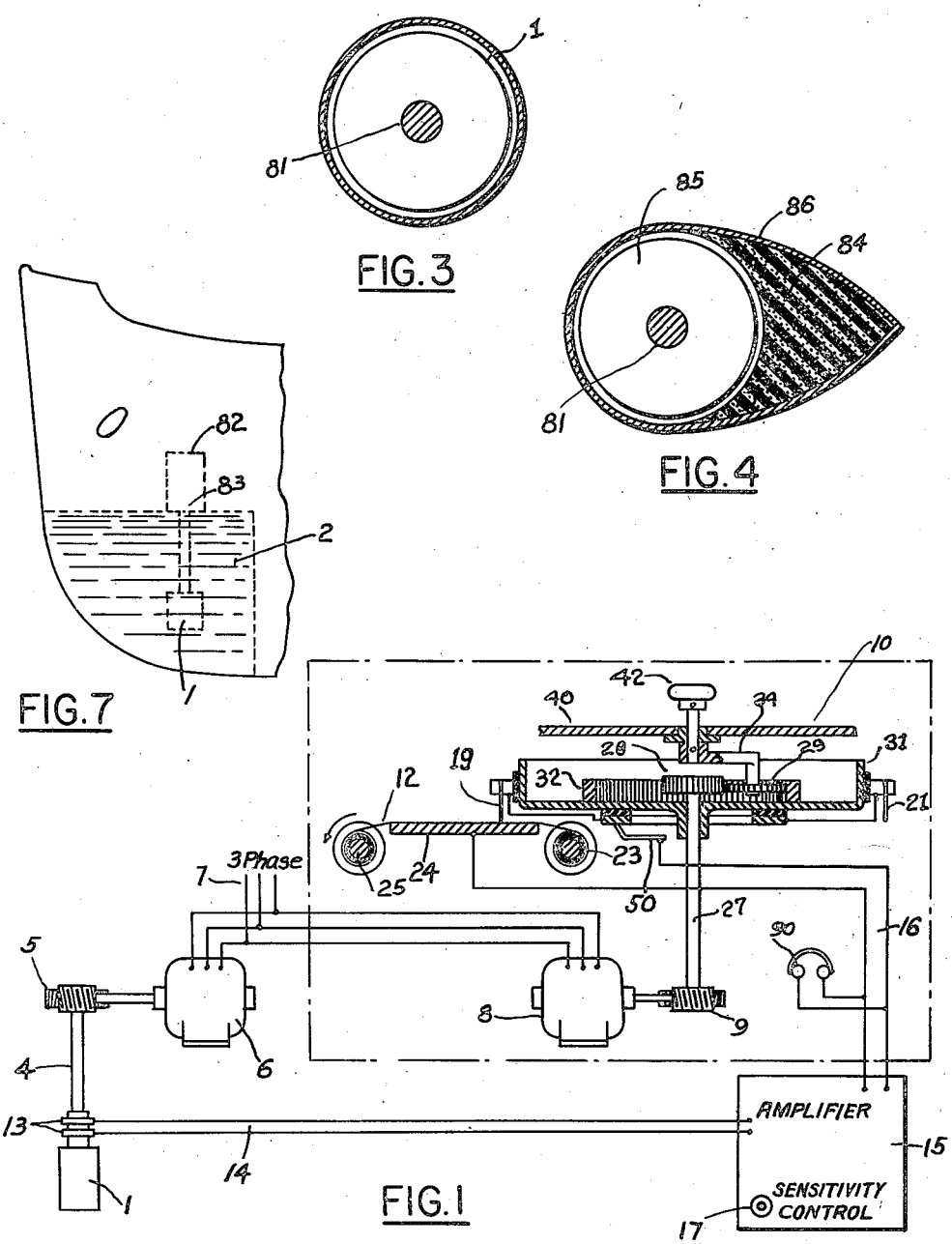

Sept. 10, 1946.   E. E. TURNER, JR   2,407,330
DIRECTION DETERMINING SYSTEM
Filed Feb. 6, 1941   3 Sheets-Sheet 1

INVENTOR
EDWIN E. TURNER, JR.
BY
his ATTORNEY

Sept. 10, 1946.    E. E. TURNER, JR    2,407,330
DIRECTION DETERMINING SYSTEM
Filed Feb. 6, 1941    3 Sheets-Sheet 2

INVENTOR.
EDWIN E. TURNER, JR.
BY

Sept. 10, 1946.                    E. E. TURNER, JR                    2,407,330
                             DIRECTION DETERMINING SYSTEM
                       Filed Feb. 6, 1941            3 Sheets-Sheet 3

INVENTOR.
EDWIN E. TURNER, JR.

BY

Patented Sept. 10, 1946

2,407,330

UNITED STATES PATENT OFFICE 2,407,330

DIRECTION DETERMINING SYSTEM

Edwin E. Turner, Jr., West Roxbury, Mass., assignor, by mesne assignments, to Submarine Signal Company, Boston, Mass., a corporation of Delaware Application February 6, 1941, Serial No. 377,687

14 Claims. (Cl. 181—26)

The present invention relates to the detection of objects through the emission of sound waves given out by the object to be detected. In particular, the invention relates to the detection of vessels moving through the water by means of detection of sound waves emitted by the vessels either through their motion in the water or through sound sources on the vessels themselves.

The invention further relates to a means for avoiding collision between two moving vessels by detection of the sounds emitted by one vessel and establishing the relative directions of travel of the vessels with respect to each other.

In the present invention means are provided whereby it is possible to establish readily whether the courses taken by the vessels would be such as to ultimately bring about a collision.

A further and important utility of the present invention is in the detection of submarines and also surface vessels in the neighborhood of the vessel upon which the present invention is employed and thereby enables the vessel to set such a course as to avoid attack or collision, as the case may be.

The present invention is particularly adaptable for all kinds of surface crafts where it is desired to maintain a continuous observation of the waters surrounding the vessel without the addition of special help assigned to the listening task.

The present invention differs from previous systems aimed to accomplish the same purpose in that according to the methods herein employed, the directive listening device functions for its complete revolution about a vertical axis enabling it to pick up sounds of ship or propeller noises from substantially all horizontal directions.

Instead of indicating the presence of foreign bodies either by a visual indicator or through a listening device, the principal method of indication employed is the recording of all sounds on a recording paper in such a manner that sounds received from the same bearings produce a continuous line or curve so that the presence and the course of a foreign vessel are readily discernable.

The present method has a particular advantage in a listening field where a number of sounds may be present and where a good deal of interference is given by the motion of the vessel on which the equipment is installed. In such cases the continued record of a sound will produce a continuous line or curve which will aid in the discovery of the presence and direction of a foreign vessel.

In accordance with the present invention a directive receiving device is used which is capable of receiving sound in a fairly broad beam of the order of 30 to 50 degrees opening. The frequency best suited with this type of unit for the present purpose is a unit which has a fairly broad resonance in the range of 5000 to 15,000 cycles per second. For this purpose the directive receiver may be a simple electroacoustic unit or a magnetostrictive unit or a piezoelectric unit or a combination of units or a plurality of units whose linear surface dimensions are such as to provide the desired directive qualities. As a rule such units may be made to have either sharp resonance at certain frequencies or broad resonance extending over a frequency of 1000 to 2000 cycles. In some cases the broad resonance may be used with the resonance peak located wherever operation proves most satisfactory.

In addition to the features set forth above a further advantage is obtained in the present invention through the control of the sensitivity of the amplifier between the receiving unit and the recording or indicating device. In the system according to the present invention wherein the signal is produced on a recording paper during the time interval it is present, the lightness or darkness of the indication on the paper shows where the greatest intensity of the signal occurs and in this way even with a comparatively broad beam a very accurate indication of the direction of the sounds from the foreign vessel may be obtained.

These factors which have been briefly described are of comparatively great importance in the present art of listening since the detection of sounds from foreign vessels is practically always greatly hindered by noises of the ship on which the listening apparatus is located. These sounds are first due to noises created on the ship itself which circulate through the skin of the vessel; secondly, noises created by the motion of the vessel through the water and the motion of the water against the vessel; and thirdly noises created by the ship's propeller. In the present system the effect of these sounds on the receiving system is held at a minimum by using a projection device which projects the receiving unit below the keel of the vessel. Preferably the projecting unit comprises a casing of streamlined body, if desired, which remains stationary after it is once projected below the bottom of the vessel. Within this casing the receiving or pickup unit is rotated continuously at a rate of the order of one or two revolutions per second. If the recording paper is moved at a very slow rate of speed, for instance, of the order of one inch every five minutes, then the record produced by a sound in the vicinity of the vessel will have a sufficient number of points to produce a continuous line. If it is desired to screen the rotating unit from sounds coming from certain directions, as, for instance, the direction of the ship's propeller, this may be done by proper sound insulation internally or externally of the stationary projected member. Further noise reduction may be obtained by shaping the stationary projection unit as a stream-lined body.

Figures 2, 8:
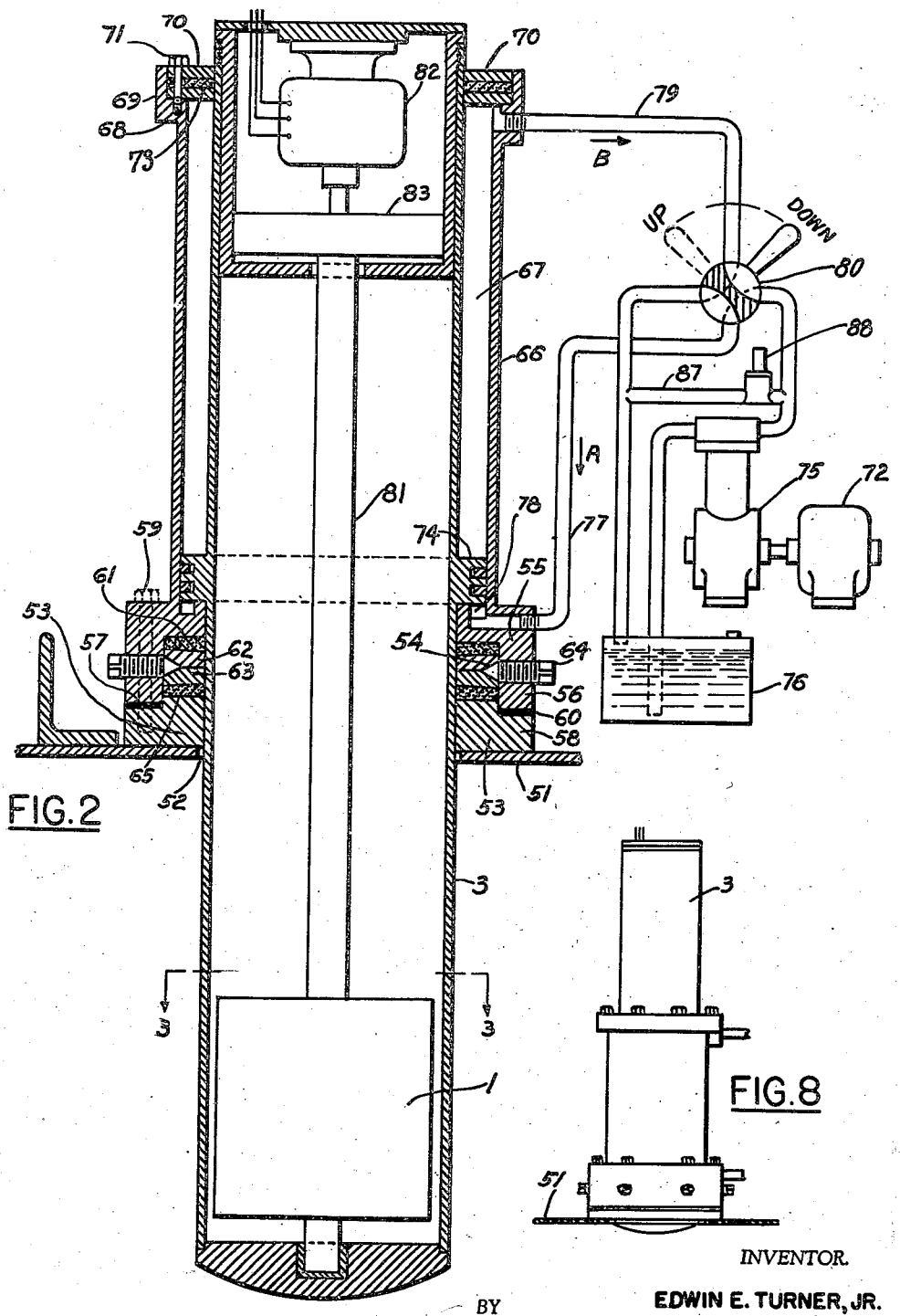
Figure 6:
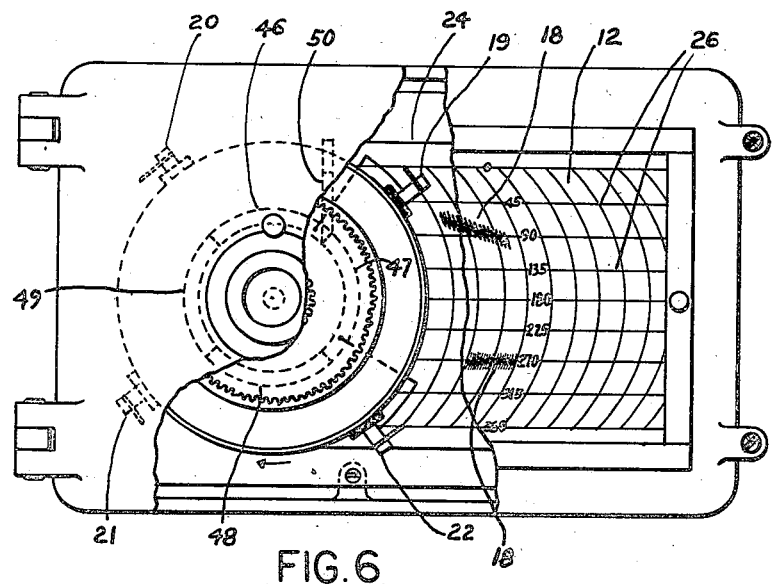
Figure 5:
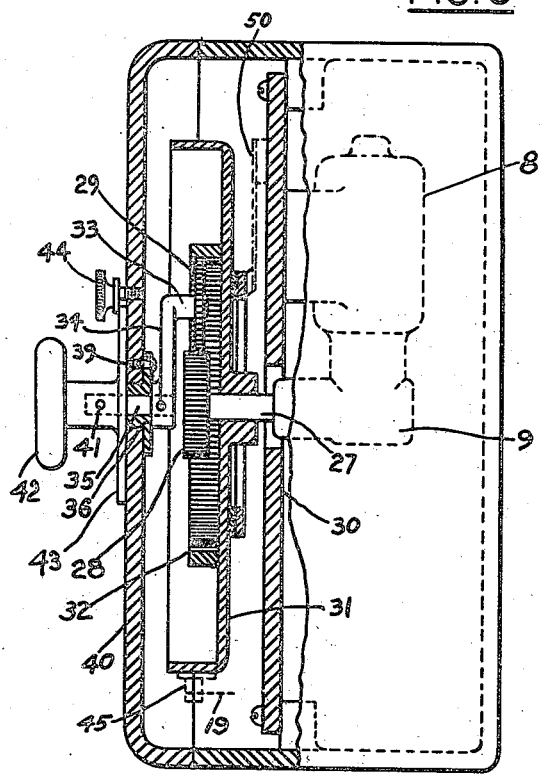
Figure 9:
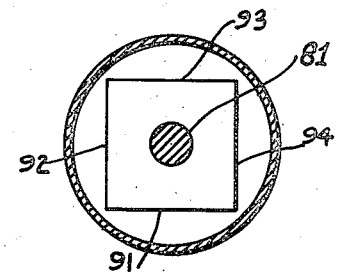

The present invention is more fully described in the specification below in connection with the drawings illustrating an embodiment of the invention in which Fig. 1 shows the invention schematically; Fig. 2 shows a substantially central vertical section of a detail of the invention including the receiving unit and its installation in the vessel; Fig. 3 shows a section on the line 3—3 of Fig. 2; Fig. 4 shows a modified form of the section indicated in Fig. 3; Fig. 5 shows a fragmentary central sectional view of the indicating apparatus of Fig. 1 showing further details and relationship of these details with respect to the indicator casing; Fig. 6 shows a plan view of the means indicated in Fig. 5 with the cover partly removed; Fig. 7 shows a modification with the receiver unit installed in a liquid tank within a vessel; Fig. 8 shows a diminutive view of the apparatus of Fig. 2 with the unit retracted into the vessel; and Fig. 9 shows a modification of the view shown in Fig. 3 where several directive pickup units are used.

In the drawings, the receiving unit 1 of Fig. 1 may be any directive receiving element as, for instance, a Rochelle salt pickup unit using a plurality of crystals active over a large substantially plane surface or a magneto-strictive pickup device using a plurality of units or any known directive receiver. The receiving should have a sensitivity pattern having a lobe embraced within a conical angle in which the central axis of the lobe may correspond to the normal referred to the receiving surface. As the receiver is rotated, therefore, when the normal is facing the sound source, the sound received will attain its greatest strength, diminishing when the receiver is turned to one side or the other. This unit may be rotated in a tank 2, Fig. 7, which may be a liquid-filled fore peak tank of a vessel or the unit may be projected externally of the vessel within a housing 3 having liquid covering the receiving unit 1, or, if desired, it may be in direct contact with the external water, in which case the housing 3 is omitted. The receiving unit 1 is driven by a shaft 4 through a suitable reduction gear 5 from a synchronous motor 6 which may be operated from a three-phase alternating current line as indicated at 7. A second synchronous motor 8 drives through a reduction gear 9 the indicating system 10 in which the sounds picked up by the listening or pickup unit 1 are recorded through a recording stylus 19 marking on a recording paper 12. Sound transmitted by the pickup unit 1 is transmitted through the slip rings 13 over the cable 14 to the amplifier 15, the output of which is transmitted by the wires 16 to the recording paper 12 and the stylus 19. The amplifier 15 may be of any one of the usual types with a sensitivity control 17 which is set so that the amplitude of the signal may be noted by the lightness and heaviness of the record on the recording paper. This may be accomplished by setting the amplifier sensitivity at such a value or setting that a loud signal will be needed to make a dark mark on the paper. The recording paper 12 may be of the type commonly used for facsimile recording in telegraph or radio transmission wherein the recording paper is somewhat conductive and the surface is reduced to produce marks of light and dark intensity in relation to the current passed through the paper and stylus from the output of the amplifier. The variations in signal strength are therefore recorded on the recording paper. This recording paper is of such a type that the current strength passing through it will cause a black mark whose blackness is in proportion to the strength of the signal. In this case, therefore, as the projector or receiver 1 is rotated through the direction from which the signal comes, the recorded signal will become more pronounced as the receiver unit lines up with its directive axis in the direction of the sound source. In this way even though the angle of reception for the receiver may be 40 or 50 degrees, the exact direction of the sound source may be determined. To provide the best record for the source which is being observed, the sensitivity control of the amplifier 17 may be adjusted so that a considerable variation in the shade of the recorded signal from the beginning to the end may be observed. This is indicated by the signals 18 of Fig. 6.

In the system above described the synchronous motors 6 and 8 are driven at the same speed and in synchronous phase. As indicated in Fig. 6, four styli are provided 19, 20, 21 and 22. As each stylus rotates through a quarter of a revolution, the listening or pickup unit 1 rotates through one revolution so that the speed of the rotating stylus is geared four to one with respect to the pickup device, the synchronous motors 6 and 8, however, preferably rotating at the same speed. The recording paper 12 is fed from the roll 23 over the conducting plate 24 and wound up on the roll 25 in any usual manner at a slow rate of speed which may be of the order of an inch every five minutes or even slower. The paper 12 is preferably ruled longitudinally by lines 26 calibrated in degrees and the styli 19 to 22, inclusive, are rotated in circular rotation over the paper. The calibrated lines 26 will therefore be slightly closer together at the edges than at the middle of the paper. However, this will not interfere with the interpolation between lines of the direction of the sound source.

The mechanism for rotating the stylus and obtaining the initial synchronizing adjustment between the transmitter and the rotating styli is indicated in Figs. 5 and 6. In Fig. 5 the synchonous motor 8 drives through the reduction gear 9 the shaft 27 upon which is rigidly mounted the gear 28 which drives an idler gear 29. The shaft 27 also has mounted thereon, free to rotate about it, the hub 30 of the stylus pan 31. The pan 31 has mounted concentrically with the shaft 27 a ring gear 32 which engages the idler gear 29. The idler gear 29 is mounted to rotate freely in the bearing 33 supported by the arm 34 which, in turn, is centrally pivoted over the shaft 27 to the shaft 35 to which the arm is pinned by means of the hub 36 or bearing from which the arm 34 extends. The shaft 35 passes through the supporting bearing 36 which is mounted by means of bolts 39 to the casing cover 40 and at its other end is pinned by means of the pin 41 to the handwheel 42 so that rotating of the handwheel 42 will rotate the shaft 35 and rotate the idler gear 29 to any desired position between the ring gear 32 and the central gear 28. The handwheel 42 is provided with a plate 43 facing the casing 40 and after the idler gear 29 is set in place, the whole assembly may be clamped by means of the clamp screw 44 which holds the plate 43 to the casing 40. The stylus pan 31 carries at its external side in positions 90 degrees apart the stylus bracket 45 in which the styli 19 to 22 are mounted.

In the operation of the indicator shown in Fig. 5 the shaft 27 drives the gear 28 which drives the idler 29, after it has been placed in position, and thereby drives the ring gear 32 rotating the stylus pan 31. In Fig. 6, which indicates a plan view of the recording device, it will be seen that each of the styli is connected with a conducting segment 46, 47, 48 and 49, respectively, to which the signal impulse is fed by means of the brush 50 mounted on a fixed part of the indicator. The other connection to the amplifier terminal is made to the plate 24 over which the paper 12 is fed. As each stylus, therefore, comes in contact with the recording paper, the circuit is completed to the amplifier and a signal is ready to be recorded on the recording paper. The synchronizing of the styli and the pickup device may be obtained either from a fixed known source of sound as, for instance, a small test unit placed in the vicinity of the pickup unit or from some fixed sound as the propeller of the vessel in a known direction. The latter may be used in the position of 180° or 360°, in which case the handwheel 42 is rotated until the propeller sound line is brought into the correct position. After that the idler gear is locked in place and no further adjustment need be made during that series of operations.

It will be evident, of course, that more than one signal may be recorded on the recording paper and that certain fixed objects as, for instance, the propeller, will produce a continuous and permanent record on the paper indicating not only the synchronism of the indicator and the pickup unit, but also the continuous operation of the whole apparatus.

In Figs. 2, 3 and 4 there is shown an arrangement for using the listening unit projected through the vessel. In Fig. 2 the skin of the vessel is indicated at 51 through which there is provided a perforation 52. This perforation may be reinforced with a heavy ring or mounting plate 53 in which there is an opening through which the projecting shell 3 may be extended into the water below. The mounting plate 53 may form one side of a packing gland as shown in Fig. 2. In this case there is provided a second plate 55 which has a downwardly extending collar 56 providing a surface 57 abutting a peripheral flange 58 on the mounting plate 53. Suitable bolts or studs 59 may hold the plate 55 to the mounting plate 53 with a gasket 60 between the two elements to provide a watertight joint. The packing gland unit is composed of two flexible gaskets 65 and 61 thicker on the inner edges than on the outer. These gaskets are held apart by suitable metal rings 62 and 63 which are forced against the packing by means of a series of special bolts 64 whose conical ends work in a V-shaped groove 54 to force the packing elements 61 and 65 against the wall of the unit 3.

The plate 55 may be formed, if desired, as a part of an upwardly extending cylinder 66 surrounding the projecting unit 3 and providing an oil chamber 67 by means of which the unit 3 is raised and lowered by hydraulic means. The top of the shell 66 has a suitable packing gland and plate to make a liquid-sealed joint at the top of the casing 3. For this purpose the shell 66 has an outwardly projecting flange 68 and a collar 69 with a top plate or ring 70 held by means of bolts 71 within which are packing gaskets 73. The cylinder or casing 3 is provided with a suitable piston ring 74 which may be welded to the casing and which forms a liquid-sealed joint between the casing 3 and the outer shell 66. The whole unit 3 may be raised by means of the hydraulic system comprising an electric motor 72 and a suitable pump 75 with an oil or liquid reservoir 76. One connecting pipe 77 connects through the plate 55 to the lower chamber 78 while the connecting pipe 79 connects through the walls 66 to the upper chamber 67. A reversing valve 80 with up and down positions, as indicated, is provided whereby the liquid may be pumped in desired directions through the pipes 77 and 79. In the position indicated in Fig. 2 when it is desired to raise the unit, the liquid is pumped in the direction of the arrows A and B in the pipes 77 and 79, respectively. In this way the hydraulic liquid is forced into the chamber 78 raising the unit 3 until the piston ring 72 reaches the top of the device. A suitable relief valve or by-pass pipe 87 and valve 88 may be used to relieve excessive pressures in the limiting positions of the housing 3. The unit 1, as indicated in Fig. 2, is rotated by means of the shaft 81 through the motor 82 and reduction unit 83. This motor is mounted in a permanent position within the shell 3 so that relatively the elements within the casing 3 are always in the same position.

The device indicated in Fig. 2 may have the cross section shown in Fig. 3. If desired, however, the cross section may be that shown in Fig. 4, in which case the rear portion of the casing 3 may be filled with a sound-insulating element 84 so as to shield the pickup unit 85 from sounds coming from the propeller. The unit whose section is shown in Fig. 4 is otherwise similar to that of Fig. 1, the pickup unit 85 being rotated similarly by means of the motor in a fixed position within the casing 86 corresponding to the casing 3.

Primarily in the present system the sound picked up is recorded, but if the operator desires to listen to the sounds picked up by the pickup unit 1, there is provided a telephone receiver 90 which may be in the form of head phones, as shown, or a loud speaker may be used and may be placed in the vicinity of the indicator.

Continuous listening, however, on the telephones 90 or by any other means is completely avoided and a complete record of sounds picked up in the vicinity of the vessel is always and permanently available through the record sheet. In addition to this, if a foreign noise appears in the field and this maintains a constant bearing, as indicated by a straight line on the chart, then it will indicate immediately that there is danger of a collision with the object emitting the sound. The advantage of this is not only for the purpose of quickly establishing whether the foreign source of sound is apt to be in collision with the vessel, but it has also a further advantage since the rotating unit makes comparatively a great number of rotations in relation to the movement of the recording paper, as a result of which the signals from a definite continuous source will more readily tend to establish a mark on the paper than indications from stray sources which disappear after a few sounds have been received.

A further advantage is gained with the present mechanism since the record gives a good indication of the sound intensity much better than is obtained by the ear itself. Therefore, the direction of sound is more accurately established since the record is more intense when the pickup unit is bearing directly towards the sound source and therefore the signal line drawn on the chart shows clearly the direction of the source with great accuracy even though the signal is received over a comparatively wide band on the recording paper.

If desired, the pickup element may be composed of a number of units each adapted to receive more particularly in different frequency ranges. In fact, if desired, each of the styli 19, 20, 21 and 22, may be associated with different pickup units so that if a foreign vessel is apt to give a frequency that is out of the range of one unit, it will still be heard by the next unit as it sweeps around the horizontal listening direction. If each stylus is used in combination with a pickup element of a different frequency, four units will be incorporated in the pickup element 1, each facing 90° from the other, as shown in Fig. 9, and comprising substantially four receiving surfaces 91, 92, 93 and 94. In this case each of the units will be connected to the stylus which is moving across the recording sheet, and sounds over the frequency range of the particular unit will be picked up and recorded. For instance, in Fig. 9 the unit 91 may have a frequency range of from 5000 to 8000 cycles, 92 from 8000 to 11,000 cycles, 93 from 11,000 to 14,000 cycles, and 94 from 14,000 to 16,000 cycles per second. These figures are, of course, only illustrative and the range may be broader or narrower as desired. In general, however, with the narrower range the pickup unit becomes more sensitive and so these elements are necessarily adapted for the specific conditions for which the apparatus is to be used.

Having now described my invention, I claim:

1. A system for detecting the direction of a source of sound whose position is unknown from an observing vessel comprising a directional receiving element carried by the vessel and adapted to pick up sounds from said source, means for rotating said receiving element continuously, a recording sheet, means for moving a recording stylus over said recording sheet for recording the sounds picked up by said receiving element, the motion of said recording stylus being in synchronism with the rotation of said receiving element and means for moving said recording sheet transversely to the motion of the stylus at a velocity substantially lower than that of the stylus, whereby the presence of a sustained sound will produce a substantially continuous curve on the recording sheet indicating the direction of the sound source.

2. A system for detecting the direction of a source of sound whose position is unknown from an observing vessel, comprising a directional receiving element carried by the vessel and adapted to pick up sounds from said source, means for rotating said receiving element continuously, means for amplifying the sound picked up by said receiving element, a recording means having means for producing a mark by the action of the sound received comparable in intensity to the sound as picked up including a recording indicator rotated in synchronism with the rotation of said receiving element and a recording paper moved transversely to said indicator at a relatively slow speed and in such relation thereto whereby said indicator may produce said mark on said paper, whereby the presence of a sustained sound will produce a substantially continuous curve on the recording sheet indicating the direction of the sound source.

3. A system for detecting the direction of sound source whose position is unknown from an observing vessel comprising receiving means sensitive to sound approaching from a direction embracing a directive axis of the receiving means carried by the vessel and adapted to pick up sounds from said source, means for rotating said receiving means continuously about a horizontal plane and recording means including a recording sheet, a recording stylus, means for moving said recording stylus over said recording sheet in synchronism with the rotation of said receiving means and means for moving the recording sheet transversely to the motion of the stylus at a velocity substantially lower than that of the stylus whereby the presence of a sustained sound will produce a substantially continuous curve on the recording sheet indicating the direction of the sound source.

4. In a system for detecting the direction of a sound source whose position is unknown from an observing vessel comprising directional receiving means mounted therein, means for projecting said receiving means below the skin of the vessel into the free water beneath, means for rotating said receiving means continuously and indicating means for indicating and recording the sound received by said receiving means, said indicating means including a rotating element rotating in synchronism with the means for rotating said receiver and means continually connecting said indicating means with said receiving means.

5. In a system for detecting the direction of a sound source whose position is unknown from an observing vessel comprising directional receiving means mounted in said vessel, means for projecting said directional receiving means down below the skin of the vessel in the sound-free water beneath the vessel, means for rotating said receiving means, sound-recording means adapted to receive and record the sound picked up by said receiving means and means rotated in synchronism with the means rotating said sound receiver for producing a record of the sound picked up by said receiving means and indicating thereby the direction of the source.

6. In a system for detecting the direction of a sound source whose position is unknown from an observing vessel, means mounted within said vessel comprising an elongated casing mounted to be projected through an opening in the vessel, means for projecting said casing through the vessel, directional sound receiving means mounted in a fixed position within said casing and means also mounted within said casing for rotating said sound-receiving means about a vertical axis and recording means operating in synchronism with said rotating means for recording the direction of the sound picked up by said receiving means and means connecting said sound-receiving means with said recording means.

7. In a system for detecting the direction of a sound source whose position is unknown from an observing vessel, means mounted within said vessel comprising an elongated casing, means for projecting said casing perpendicularly through the bottom of said vessel into the free water beneath the same, sound-receiving means positioned within said casing and adapted to receive directively sound waves approaching said casing, means acoustically coupling said sound-receiving means with said outer water, a shaft running longitudinally of said casing supporting at one end said sound-receiving means and means mounted within said casing at the other end of said shaft for rotating the same, a second casing positioned within the vessel and enclosing said first casing, said first casing having laterally extending flanges contacting the walls of said second casing and forming thereby two hydraulic chambers and pump means having a reversing valve for expanding one chamber as the second chamber is contracted whereby said first-mentioned casing may be projected out of or retracted into the vessel.

8. In a system for detecting the direction of a sound source whose position is unknown from an observing vessel, directive receiving means mounted upon said vessel and means for rotating said directive receiving means continuously in a horizontal plane, recording means having a recording stylus rotated in synchronism with the rotation of said receiving means and means operatively connecting said receiving means with said recording means for making a record of the sounds picked up by said receiving means.

9. In a system for detecting the direction of a sound source whose position is unknown from an observing vessel, directive receiving means mounted upon said vessel and means for rotating said directive receiving means continuously in a horizontal plane, recording means having a recording stylus rotated in synchronism with the rotation of said receiving means and means operatively connecting said receiving means with said recording means for making a record of the sounds picked up by said receiving means, the stylus of said recording means and said receiving means being driven independently by separate synchronous motors and means connected between the synchronous motor driving the stylus and the stylus itself for adjusting the phase of synchronism of the stylus with that of the receiving means.

10. In a system for detecting the direction of a sound source whose position is unknown comprising directive sound-receiving means and recording means operatively connected with said receiving means for recording the sound impulse picked up by said receiving means, said receiving means and said recording means having means independently rotating each at a synchronous speed, said recording means including a stylus, a ring gear for rotating the said stylus, a gear centrally located with respect to said ring gear, said gear being driven by said synchronous means and an idler gear and means for positioning the idler gear at any point between the gear and said ring gear for establishing the desired phase of synchronism between the stylus and said sound-receiving means.

11. In a system for detecting the direction of a source of sound whose position is unknown from an observing vessel comprising a housing positioned within said vessel, means for extending said housing beneath the bottom of the vessel into the free water beneath the vessel, receiving means comprising a plurality of directive receiving units permanently faced with respect to each other, means for rotating said receiving means continuously about a horizontal plane and recording means operated synchronously with said receiving means and means selectively connecting the units of said receiving means with said recording means for indicating the sound picked up by said receiving means, each of said receiving means being broadly tuned to cover different ranges of sound frequencies.

12. In a system for detecting the direction of a source of sound whose position is unknown from an observing vessel comprising receiving means composed of a plurality of directive receiving units, each faced in fixed relation with the other units, recording means and means operatively connecting said receiving means with said recording means for recording the sounds picked up by said receiving means, the units of said receiving means being tuned to different frequency ranges whereby the entire group covers a broad frequency band for the reception of sound waves.

13. In a system for detecting the direction of a source of sound whose position is unknown from an observing vessel comprising means mounted upon said vessel for directively receiving the sound waves, said means comprising a plurality of directive units, each permanently faced with respect to the other unit, recording means, means for rotating said receiving means and said recording means in synchronism with each other, said recording means having a plurality of styli and means for connecting each of said styli with one of said receiving means as the styli come into position for recording the sound waves.

14. In a system for detecting the direction of a sound source whose position is unknown, directive receiving means having a sensitivity pattern embracing a conical angle with the sensitivity increasing in the region of the central portion of the angle, means for rotating said receiving means continuously about a horizontal plane, recording means rotated in synchronism with said receiving means, said recording means having a stylus whose position corresponds to the instantaneous position of said receiving means, said recording means having a recording paper over which said stylus moves transversely and means connecting said receiving means with said recording means including an amplifier having a sensitivity control for producing a record corresponding in intensity to the sound energy received by said receiving means, said reccording means having a recording paper adapted to produce a mark whose intensity corresponds at any instant to the energy of the received signal.

EDWIN E. TURNER, Jr.